(12) United States Patent
Liang et al.

(10) Patent No.: US 8,743,288 B2
(45) Date of Patent: Jun. 3, 2014

(54) IMAGE PROCESSING METHOD AND IMAGE PROCESSING APPARATUS

(75) Inventors: Ren Kuan Liang, Hsinchu Hsien (TW); Cheng-Yu Liao, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 553 days.

(21) Appl. No.: 12/890,801

(22) Filed: Sep. 27, 2010

(65) Prior Publication Data

US 2011/0080518 A1    Apr. 7, 2011

(30) Foreign Application Priority Data

Oct. 1, 2009    (TW) ............................. 98133341 A

(51) Int. Cl.
*H04N 5/21* (2006.01)
*H04N 5/14* (2006.01)
*H04N 7/01* (2006.01)

(52) U.S. Cl.
USPC ........................... 348/625; 348/671; 348/441

(58) Field of Classification Search
None
See application file for complete search history.

(56) References Cited

U.S. PATENT DOCUMENTS

| 4,935,806 | A | * | 6/1990 | Rabii | 348/606 |
| 4,969,045 | A | * | 11/1990 | Haruki et al. | 348/229.1 |
| 6,904,180 | B1 | * | 6/2005 | Gallagher | 382/280 |
| 7,065,257 | B2 | * | 6/2006 | Soga et al. | 382/274 |
| 2004/0036708 | A1 | * | 2/2004 | Evanicky et al. | 345/691 |
| 2005/0169553 | A1 | * | 8/2005 | Maurer | 382/266 |
| 2005/0280869 | A1 | * | 12/2005 | Kameyama | 358/3.01 |
| 2007/0052860 | A1 | * | 3/2007 | Matsubara et al. | 348/624 |

* cited by examiner

*Primary Examiner* — Nathan Flynn
*Assistant Examiner* — William J Kim
(74) *Attorney, Agent, or Firm* — Edell, Shapiro & Finnan, LLC

(57) ABSTRACT

A method and an apparatus are provided for determining whether a-low resolution image is converted to a high-resolution image, and enhancing image quality of a video signal. The image processing method includes steps of receiving a video stream; determining whether the video stream includes a converted image converted from a low-resolution image to a high-resolution image; and enhancing image quality of the video stream when the video stream includes the converted image.

16 Claims, 7 Drawing Sheets

IMAGE PROCESSING METHOD AND IMAGE PROCESSING APPARATUS

CROSS REFERENCE TO RELATED PATENT APPLICATION

This patent application is based on Taiwan, R.O.C. patent application No. 98133341 filed on Oct. 1, 2009.

FIELD OF THE INVENTION

The present invention relates to an image processing method and an image processing apparatus, and more particularly, to a method for improving image quality and an associated apparatus.

BACKGROUND OF THE INVENTION

In recent years, manufacturing technologies for display devices have matured and manufacturing costs have decreased. As a result, display devices of various sizes are available worldwide. Current design efforts are now focused on enhancing image quality of display devices and providing display characteristics that better meet user requirements.

Generally, a maximum image resolution (i.e., the number of pixels of an image in a vertical direction and in a horizontal direction) displayed by a display device is constant. However, original resolutions of video signals provided by various signal sources, e.g., a DVD player, a cable of a cable TV, or a wireless TV antenna, connected to the display device are different. In order to match with a resolution specification of the display device, the signal source apparatus for providing video signals may adjust in advance a size (i.e., a resolution) of an output image to match with a size of a screen of the display device.

It is known to a person having ordinary skill in art that the number of pixels of a low-resolution image needs to be increased so as to convert the low-resolution image to a high-resolution image. For example, in order to convert an image from a resolution of 800*600 pixels to a resolution of 1200*900 pixels, an image processing apparatus needs to interpolate 400 pixels into each row of the image, and interpolate 300 pixels into each column of the image. Gray-scale values of the interpolated pixels are mostly determined according to an interpolation calculation.

Gray-scale variations obtained by enlarging the size of the image via the interpolation calculation are quite gradual, in a way that such image may appear blurred to an observer. When a difference between the original resolution and the converted resolution is too large, the image quality may easily seem apparently unsatisfactory to the observer. However, since current display devices cannot determine whether the image is processed by a resolution conversion process according to its received signals, the foregoing problem of unsatisfactory image quality cannot be avoided.

SUMMARY OF THE INVENTION

An object of the present invention is to provide a method and an apparatus for determining whether a-low resolution image is converted to a high-resolution image, and enhancing image quality of a video signal, so as to solve the foregoing problem.

According to an embodiment of the present invention, an image processing method comprises providing an image comprising a plurality of regions; determining a gray-scale variation level corresponding to each of the plurality of regions; determining whether the image is converted from a low-resolution image to a high-resolution image according to the plurality of gray-scale variation levels; and performing image quality enhancement on the image when the image is the converted image.

According to another embodiment, an image processing apparatus comprises a determining unit and an adjusting unit. The determining unit determines whether a video stream comprises a converted image converted from a low-resolution image to a high-resolution image. When a determination result of the determining unit is that the video stream comprises the converted image, the adjusting unit performs image enhancement on the video stream.

According to yet another embodiment of the present invention, an image processing method comprises providing a video stream; determining whether the video stream comprises a converted image converted from a low-resolution image to a high-resolution image to generate a determination result; and performing image enhancement on the video stream when the determination result is positive.

The following description and figures are disclosed to gain a better understanding of the advantages of the present invention.

DETAILED DESCRIPTION OF THE PREFERRED EMBODIMENT

Figure 1:
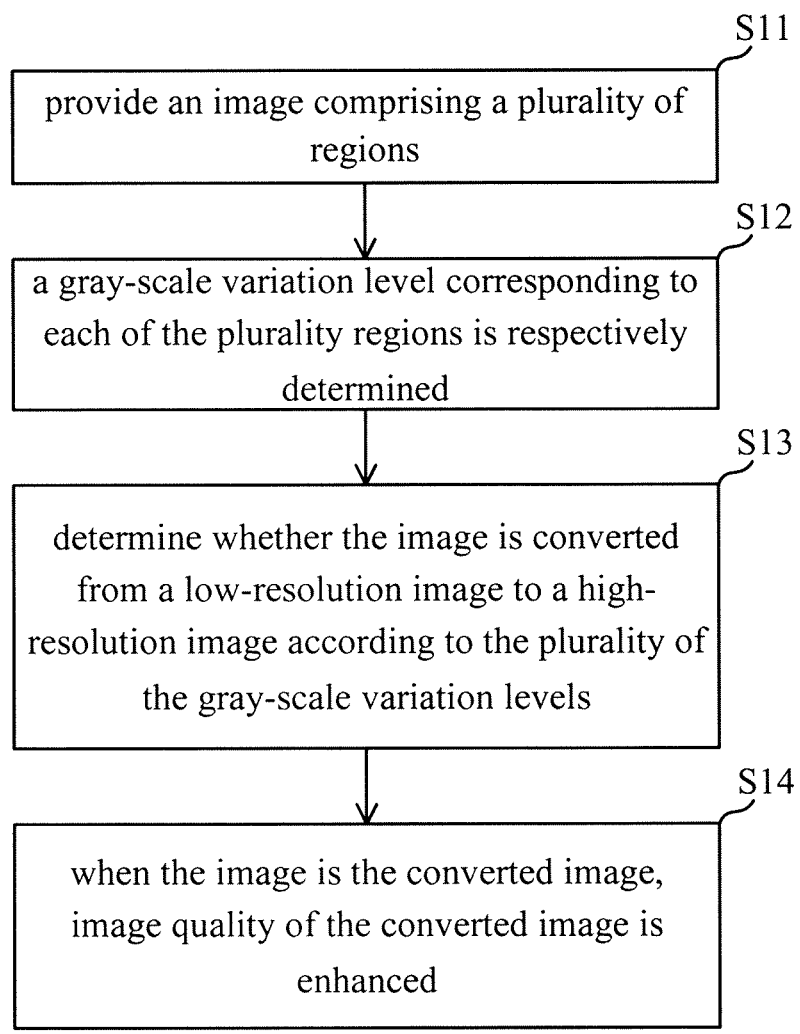
FIG. 1 is a flow chart of an image processing method in accordance with an embodiment of the present invention.

FIG. 1 shows a flow chart of an image processing method in accordance with an embodiment of the present invention. The method begins with Step S11 in which an image comprising a plurality of regions is provided. For example, an image having a resolution of 1200*900 pixels is divided into various sub-regions each having 3*1 pixels. It is to be noted that division of the regions is virtual, i.e., there are no actual dividing lines in the image and no dividing lines are added into the image.

In Step S12, a gray-scale variation level corresponding to each of the plurality regions is respectively determined. In Step S13, it is determined whether the image is converted from a low-resolution image to a high-resolution image according to the plurality of the gray-scale variation levels. As mentioned above, an image, of which a size is enlarged by resolution conversion, has characteristics of having gradual gray-scale variation levels. Therefore, when the image received in Step S11 is the converted image, the method proceeds to Step 12 in which the gray-scale variation levels of a majority of regions are not too high. Accordingly, in Step S13, it is determined whether the image is the converted image having an enlarged size resulting from the resolution conversion.

After Step S13, the method proceeds to Step S14 in which image quality is enhanced. More specifically, when the image provided in Step S11 is the converted image, image quality of the converted image is enhanced. In addition, the image may also be a part of a certain video stream comprising numerous images. When it is determined that the image is the converted image in Step S13, it means that the video stream comprising the converted image is possibly converted via the low-to-high resolution conversion. Therefore, according to the image processing method of the present invention, image quality of the video stream comprising the image is enhanced. In practice, for example, the image enhancement may comprise a sharpening processing.

In contrast, when it is determined that image provided in Step S11 is not the converted image, the method does not perform image quality enhancement on the image or the video stream comprising the image.

Suppose that a certain region of the image comprises a plurality of pixels, and each of the plurality of pixels has a gray-scale value. In Step S12, a maximum gray-scale difference (i.e., a difference between a minimum gray-scale and a maximum gray-scale) of the region is calculated according to the plurality of gray-scale values, and is regarded as a gray-scale variation level of the region. In Step S13, a sum of gray-scale variation levels of the plurality of regions is calculated and is compared with a sum threshold. When the sum is lower than the sum threshold, it means that an overall gray-scale variation level of the image is too low, meaning that the image is possibly a resolution converted image.

In an embodiment, each region of the image comprises three pixels arranged in sequence, and the region processed in Step S12 is a target region. Each region comprises in sequence a first pixel, a second pixel and a third pixel respectively having a first gray-scale value P1, a second gray-scale value P2, and a third gray-scale P3. In addition, minmax(P1, P2, P3) represents the maximum gray-scale difference generated by subtracting a minimum gray-scale value of the three gray-scale values from a maximum gray-scale, med(P1, P2, P3) represents a median gray-scale value of the three gray-scale values, and abs[P2-med(P1, P2, P3)] represents an absolute value of a difference between the second gray-scale value P2 and the median gray-scale value.

Figure 2:
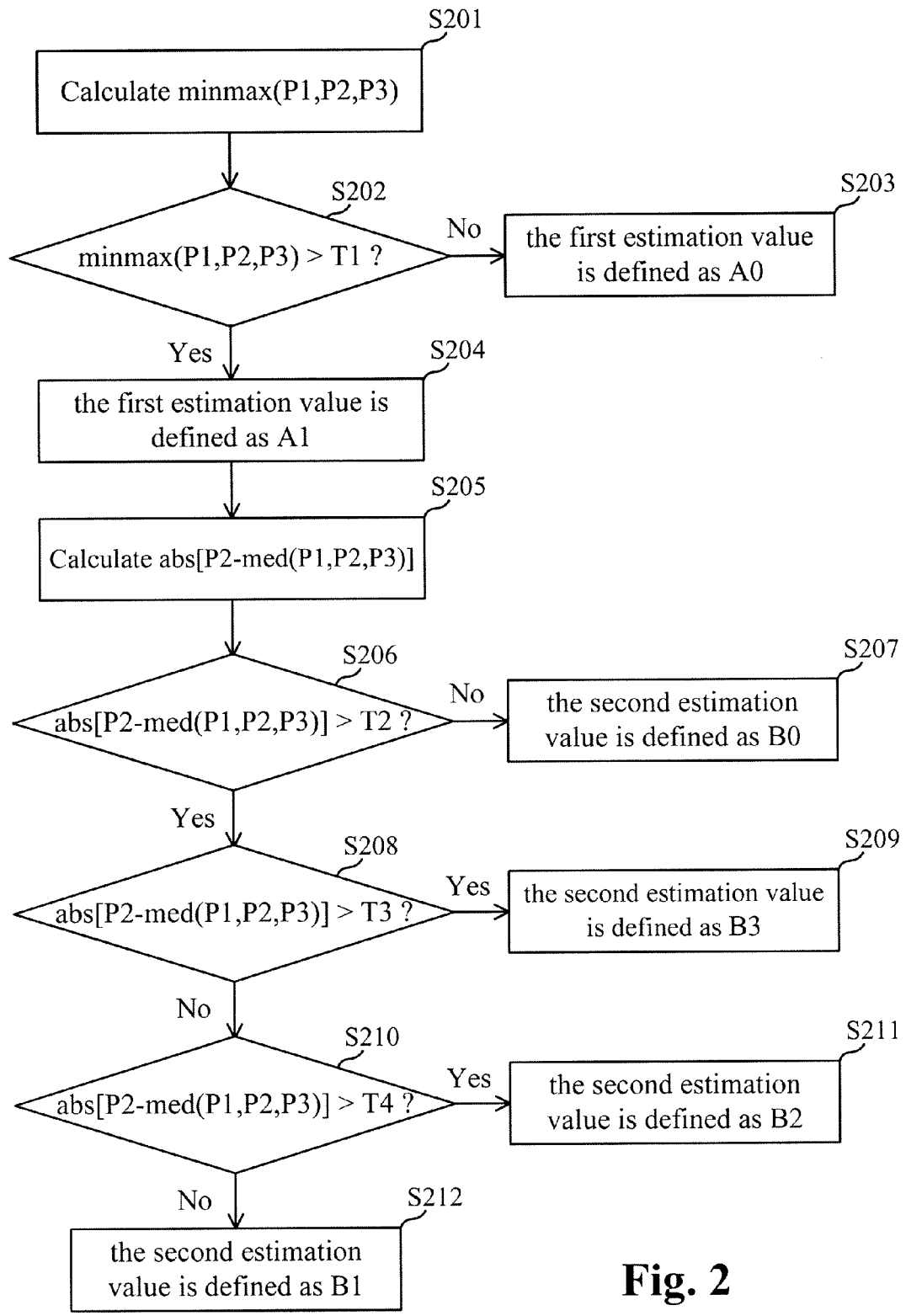
FIG. 2 is a flow chart of a method for determining a gray-scale variation level of a target region.

FIG. 2 shows a flow chart of a method for determining a gray-scale variation level of the target region according to the maximum gray-scale difference minmax(P1, P2, P3) and the median gray-scale value med(P1, P2, P3). In Step S201, the maximum gray-scale difference minmax(P1, P2, P3) is calculated. In Step S202, the maximum gray-scale difference minmax(P1, P2, P3) is compared with a first threshold T1. When the maximum gray-scale difference minmax(P1, P2, P3) is larger than the first threshold T1, it means that a certain variation in gray scales exists within a range formed by the three pixels, and the method proceeds to Step S204 in which a first estimation value is defined as A1. When the maximum gray-scale difference minmax(P1, P2, P3) is smaller than the first threshold T1, the method proceeds to Step S203 in which the first estimation value is defined as A0, where A1 is larger than A0. In other words, the higher the maximum gray-scale difference minmax(P1, P2, P3) is, the larger the first estimation value becomes.

In Step S205, the absolute difference abs[P2-med(P1, P2, P3)] is calculated. When the calculation result is equal to zero, it means that P2 is equal to the median gray-scale value med(P1, P2, P3). That is, although the determining result in Step S202 indicates that the range formed by the three pixels has a certain level of variation in the gray-scale values, P1, P2 and P3 are arranged in sequence from low to high or from high to low. As observed from the foregoing description, when P2 is equal to the median gray-scale value med(P1, P2, P3), there is not low-high-low or high-low-high gray-scale variations in the range of the three pixels. In addition, the low-high-low or high-low-high gray-scale variations become more drastic as the absolute difference abs[P2-med(P1, P2, P3)] gets larger.

In Step S206, the absolute difference abs[P2-med(P1, P2, P3)] is compared with a second threshold T2. When the absolute difference abs[P2-med(P1, P2, P3)] is lower than the second threshold T2, the method proceeds to Step S207 in which a second estimation value is defined as B0. When the absolute difference abs[P2-med(P1, P2, P3)] is greater than the second threshold T2, the method proceeds to Step S208 in which the absolute difference abs[P2-med(P1, P2, P3)] is compared with a third threshold T3. The third threshold value T3 is higher than the second threshold value T2.

When the absolute difference abs[P2-med(P1, P2, P3)] is greater than the third threshold T3, the second estimation value in Step S209 is defined as B3. When the absolute difference abs[P2-med(P1, P2, P3)] is smaller than the third threshold T3, the method proceeds to Step S210 in which the absolute difference abs[P2-med(P1, P2, P3)] is compared with a fourth threshold T4. The threshold T4 is between the second threshold T2 and the third threshold T3.

When the absolute difference abs[P2-med(P1, P2, P3)] is larger than the fourth threshold T4, the second estimation value in Step S211 is defined as B2. When the absolute difference abs[P2-med(P1, P2, P3)] is smaller than the fourth threshold T4, the method proceeds to Step S212 in which the second estimation value is defined as B1.

B0, B1, B2 and B3 are arranged from small to large. For example, the four values are respectively defined as 0, 1, 4 and 32. Referring to FIG. 2, the second estimation value becomes larger as the absolute difference abs[P2-med(P1, P2, P3)] becomes higher. The second estimation value is regarded as a weight corresponding to the absolute difference abs[P2-med(P1, P2, P3)].

According to the image processing method provided by the present invention, a variation level in the gray-scale of the target region is estimated according to both of the maximum gray-scale difference minmax(P1, P2, P3) and the absolute difference abs[P2-med(P1, P2, P3), or one of the foregoing two values to determine the gray-scale variation level of the target region.

The image provided in Step S11 comprises a plurality of regions. According to the image processing method provided by the present invention, in Step 12, the steps in FIG. 2 are performed on each region of the image to determine the first estimation value and the second estimation value corresponding to the gray-scale variation level of each of the regions. In Step S13, the first estimation values and the second estimation values of all regions are accumulated to determine whether the image is the converted image. When the accumulated first estimation value and the accumulated second estimation value indicate that the overall gray-scale variation is not large enough, it is determined the image is an image that was previously resolution converted to an enlarged size. In this embodiment, according to the image processing method provided by the present invention, it is determined whether the image is an image that was previously resolution converted to an enlarged size according to a part of the image. For example, it is determined whether the image is an image that was previously resolution converted to an enlarged size according to ¼, ½ or ⅔ of content of the image.

Figure 3A:
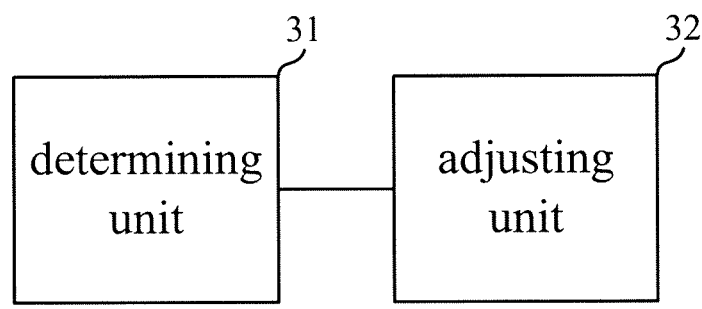
FIG. 3A is a block diagram of an image processing apparatus in accordance with an embodiment of the present invention.

FIG. 3A shows a block diagram of an image processing apparatus in accordance with an embodiment of the present invention. The image processing apparatus comprises a determining unit 31 and an adjusting unit 32. The determining unit 31 receives an image comprising a plurality of regions, and determines a gray-scale variation level corresponding to each of the regions, so as to determine whether the image was converted from a low-resolution image to a high-resolution image according to the plurality of gray-scale variation levels. When the determining unit 31 determines that the image is a converted image, the adjusting unit 32 performs image enhancement on the image or a video stream comprising the image. For example, the image enhancement may comprise a sharpening processing.

Figure 3B:
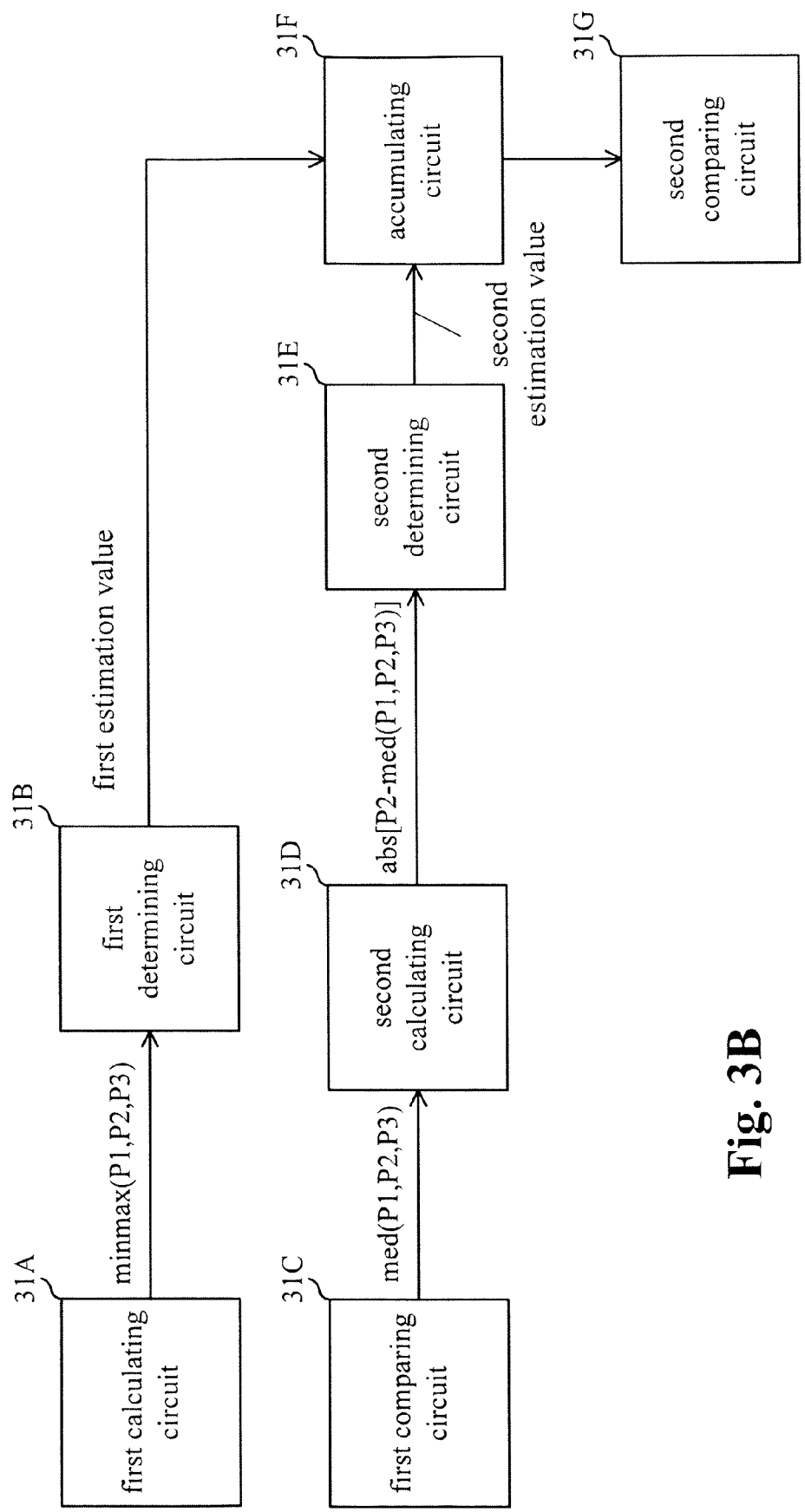
FIG. 3B is a schematic diagram of a determining unit in accordance with an embodiment of the present invention.

FIG. 3B shows a schematic diagram of the determining unit 31 in accordance with an embodiment of the present invention. In this embodiment, the determining unit 31 comprises a first calculating circuit 31A, a first determining circuit 31B, a first comparing circuit 31C, a second calculating circuit 31D, a second determining circuit 31E, an accumulating circuit 31F, and a second comparing circuit 31G.

The first calculating circuit 31A is for performing Step S201 in FIG. 2, i.e., the first calculating circuit 31A calculates a maximum gray-scale difference minmax(P1, P2, P3) of a target region according to three gray-scale values of the target region. The first determining circuit 31B is for performing Step S202 to Step S204, i.e., the first determining circuit 31B determines a first index (i.e., a first estimation value) of the gray-scale variation level of the target region.

The first comparing circuit 31C compares the first gray-scale value, the second gray-scale value and the third gray-scale value, and selects a median gray-scale value from the foregoing three values. In other words, the first comparing circuit 31C calculated a med(P1, P2, P3). The second calculating circuit 31D calculates an absolute difference abs[P2-med(P1, P2, P3)]. The second determining circuit 31E performs Step S206 to Step S212, i.e., the second determining circuit 31E determines a second index (i.e., a second estimation value) of the gray-scale variation level of the target region according to the absolute difference abs[P2-med(P1, P2, P3)].

The accumulating circuit 31F respectively calculates a first estimation value sum and a second estimation value sum of each of the regions. The second comparing circuit 31G compares the first estimation sum with a first sum threshold, and compares the second estimation sum with a second sum threshold. When the two sums are lower than the corresponding thresholds, the determining unit 31 determines the image as the converted image.

The determining unit 31 as shown in FIG. 3B is just an embodiment of the present invention. In practice, the determining unit 31 may only comprise the first calculating circuit 31A, the first determining circuit 31B, the accumulating circuit 31F, and the second comparing circuit 31G to determine whether the image is the converted image according to the first estimation sum. The determining unit 31 may only comprise the first comparing circuit 31C, the second calculating circuit 31D, the second deter mining circuit 31E, the accumulating circuit 31F, and the second comparing circuit 31G to estimate whether the image is the converted image according to the second estimation sum.

Figure 4A:
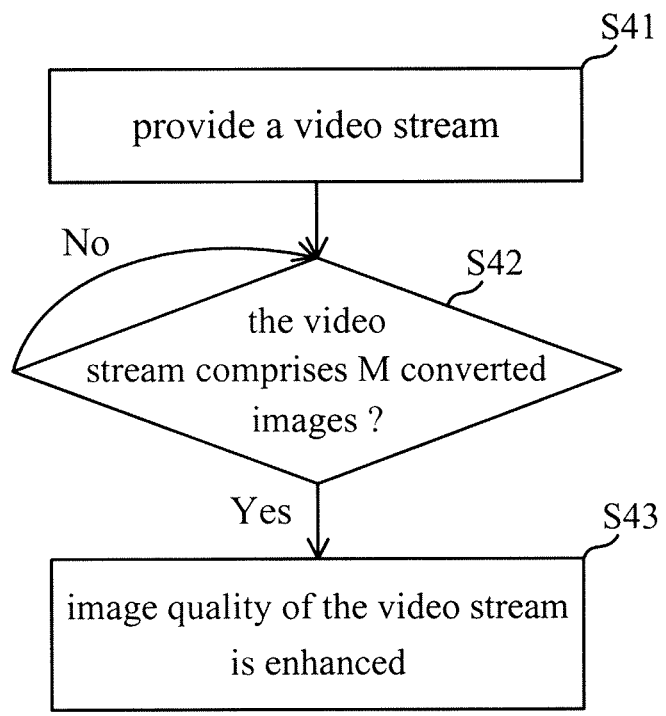
FIGS. 4A and FIG. 4B are flow charts of an image processing method in accordance with another embodiment of the present invention.

FIG. 4A shows a flow chart of an image processing method in accordance with another embodiment of the present invention. The method begins with Step S41 in which a video stream is provided. In Step S42, it is determined whether the video stream comprises M converted images converted from low-resolution images to high-resolution images, where M is a positive integer. When a determination result from Step S42 is positive, the method proceeds to Step S43 in which image quality of the video stream is enhanced (e.g., via a sharpening processing). In contrast, when the determination result from Step S42 is negative, the method proceeds to Step S42 in which it is determined whether the video stream comprises other converted images.

When M is equal to 1, it means that Step S43 is performed provided that it is determined the video stream comprises one converted image. When M is larger than 1, it means that Step S43 is performed only when more than one converted image of the video stream are detected in Step S42. For example, there are two possible situations for the Step S42. Under the first situation, it is determined whether the video stream comprises M consecutive converted images. Under the second situation, it is determined whether the video stream comprises M converted image that may be inconsecutive.

Figure 4B:
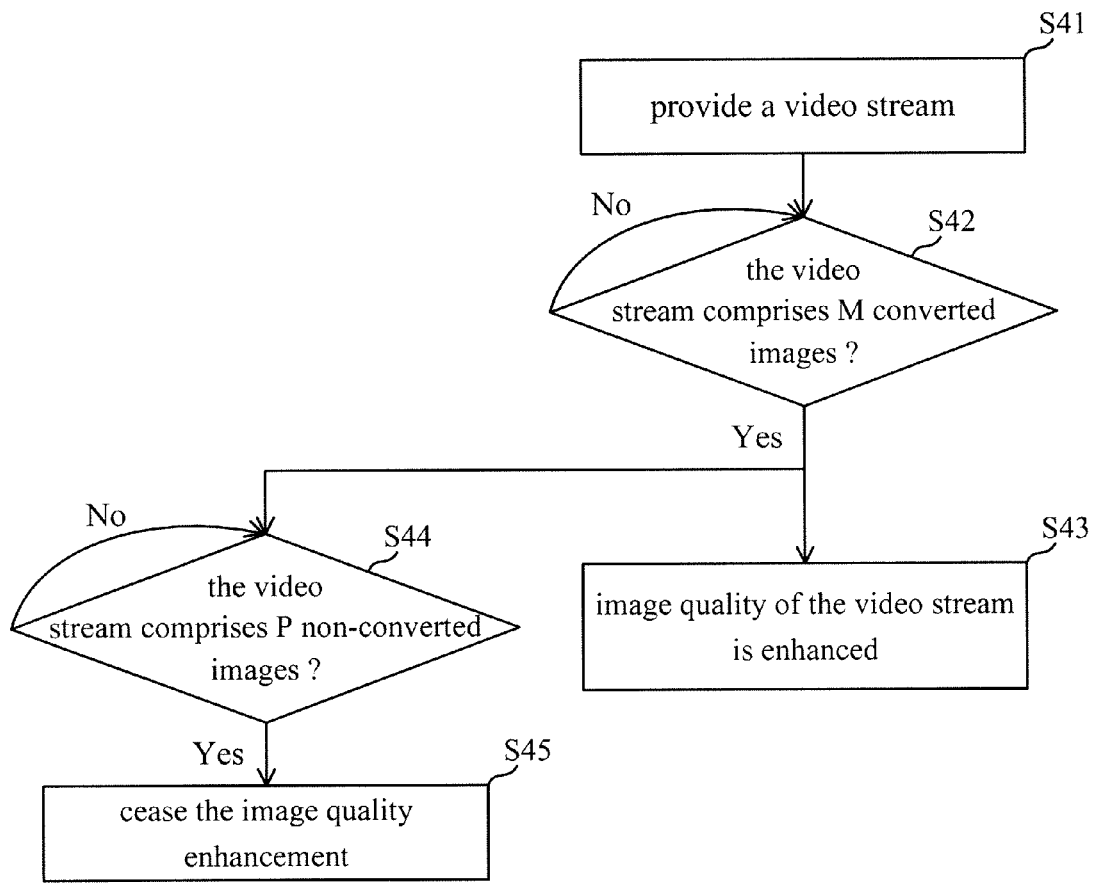

FIG. 4B shows an image processing method in accordance with an embodiment extended from the embodiment in FIG. 4A. In this embodiment, when the determination result from Step S42 is positive, apart from Step S43, the method proceeds to Step S44. In Step S44, it is determined whether the video stream comprises P non-converted images after M converted images, where P is a positive integer. When a determination result from Step S44 is positive, it means that errors may occur in the foregoing determinations, i.e., images after M converted images of the video stream are non-converted images. Therefore, when the determination result from Step S44 is positive, the method proceeds to Step S45 in which the image quality enhancement on the video stream is stopped. In contrast, when the determination result from Step S44 is negative, Step S44 is performed again, i.e., it is determined whether the video stream comprises non-converted images.

When P is equal to 1, it means that the method proceeds to Step S45 once it is determined that the video stream comprises one non-converted image. When P is larger than 1, it means that Step S45 is only performed when more than one converted images of the video stream are detected in Step S44. For example, there are two different possible situations. Under the first situation, it is determined whether the video stream comprises P consecutive non-converted images. Under the second situation, it is determined whether the video stream comprises P non-converted images that may be inconsecutive.

For example, in Step S42 and Step S44, through the steps illustrated in FIG. 1 and FIG. 2, it is determined whether each of the images of the video stream is a resolution-converted image.

Figure 5:
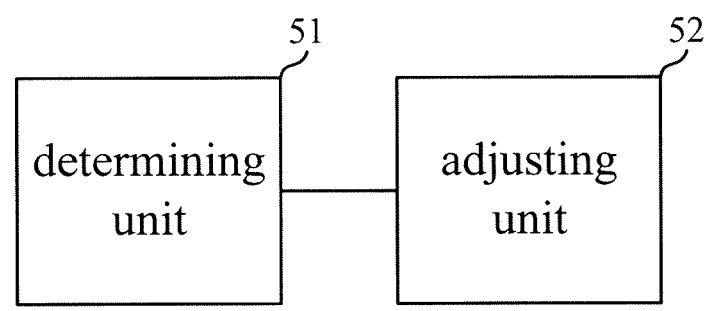
FIG. 5 is a block diagram of an image processing apparatus in accordance with another embodiment of the present invention.

FIG. 5 shows an image processing apparatus in accordance with another embodiment of the present invention. The image processing apparatus comprises a determining unit 51 and an adjusting unit 52. The determining unit 51 determines whether a video stream comprises M images converted from low-resolution images to high-resolution images. When a determination result of the determining unit 51 is that the video stream comprises M converted image, the adjusting unit 52 performs image quality enhancement (e.g., sharpening processing) on the video stream.

In addition, after it is determined that the video stream comprises M converted images, the determining unit 51 continues to determine whether the video stream comprises P non-converted images after the M converted images. When the determining unit 51 determines that the video stream comprises P non-converted images, the adjusting unit 52 stops the image quality enhancement.

Identical to the previous embodiment, the M converted images may be consecutive or inconsecutive, and the P non-converted images may also be consecutive or inconsecutive. Further, the determining unit 51 may also apply circuits in FIG. 3B to respectively determine whether each image of the video stream is a resolution-converted image.

In conclusion, the present invention provides a method and an apparatus for determining whether an image is converted from a low-resolution image to a high-resolution image, and also provides a method and an apparatus for enhancing image quality of a video stream, so as to solve the problem of unsatisfactory image quality of a resolution-converted image.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, comprising:
   receiving a video stream, wherein the video stream comprises an image that includes a plurality of regions each comprising a plurality of pixels, wherein each pixel has an associated gray-scale value;
   determining, for each of the plurality of regions, a maximum gray-scale difference representing a difference between a maximum gray-scale value of the region and a minimum gray-scale value of the region;
   determining, for each of the plurality of regions, a gray-scale variation level based on the corresponding maximum gray-scale difference;
   wherein determining, for each of the plurality of regions, a gray-scale variation level is further based on an absolute gray-scale difference representing a difference between a selected gray-scale value of the region and a median gray-scale value of the region;
   determining whether the video stream comprises a converted image converted from a low-resolution image to a high-resolution image based on the gray scale variation levels for the plurality of regions; and
   performing image quality enhancement on the video stream when the video stream comprises the converted image converted from the low-resolution image to the high-resolution image.

2. The method as claimed in claim 1, wherein the step of determining whether the video stream comprises the converted image further determines whether the video stream comprises consecutive converted images.

3. The method as claimed in claim 1, wherein the image quality enhancement comprises sharpening processing.

4. The method as claimed in claim 1, further comprising:
   determining whether the video stream comprises a non-converted image; and
   ceasing the image quality enhancement when the video stream comprises the non-converted image.

5. The method as claimed in claim 4, wherein the step of determining whether the video stream comprises the non-converted image determines whether the video stream further comprises consecutive non-converted images.

6. An image processing apparatus, comprising:
   a determining unit configured to:
      receive a video stream, wherein the video stream comprises an image that includes a plurality of regions each comprising a plurality of pixels, wherein each pixel has an associated gray-scale value,
      determine, for each of the plurality of regions, an absolute gray-scale difference representing a difference between a selected gray-scale value of the region and a median gray-scale value of the region, and
      determine, for each of the plurality of regions, a gray-scale variation level based on the corresponding absolute gray-scale difference;
      determine whether a video stream comprises a converted image converted from a low-resolution image to a high-resolution image based on the gray scale variation levels for the plurality of regions; and
   an adjusting unit configured to perform an image quality enhancement on the video stream when the video stream comprises the converted image.

7. The image processing apparatus as claimed in claim 6, wherein the determining unit determines whether the video stream comprises consecutive converted images.

8. The image processing apparatus as claimed in claim 6, wherein the image quality enhancement comprises sharpening processing.

9. The image processing apparatus as claimed in claim 6, wherein the determining unit determines whether the video stream comprises a non-converted image, and the adjusting unit ceases the image quality enhancement when the determining unit determines that the video stream comprises the non-converted image.

10. The image processing apparatus as claimed in claim 9, wherein the determining unit determines whether the video stream comprises consecutive non-converted images.

11. The image processing apparatus as claimed in claim 6, wherein the determining unit is configured to determine, for each of the plurality of regions, a gray-scale variation level based on a maximum gray-scale difference representing a difference between a maximum gray-scale level of the region and a minimum gray-scale value of the region.

12. An image processing method, comprising:
   receiving an image comprising a plurality of regions that each comprise a plurality of pixels each having a gray-scale value;
   respectively determining a gray-scale variation level corresponding to each of the regions by:
      calculating a maximum gray-scale difference of the target region representing a difference between a maximum gray-scale value of the region and a minimum gray-scale value of the region,
      calculating an absolute gray-scale difference representing a difference between a selected gray-scale value of the region and a median gray-scale value of the region,
      calculating the gray-scale variation level of the target region according to the maximum gray-scale difference and the absolute gray-scale difference,
   determining whether the image is a converted image converted from a low-resolution image to a high-resolution image according to the plurality of gray-scale variation levels, and
   performing image quality enhancement on the image when the image is the converted image.

13. The method as claimed in claim 12, further comprising:
   performing image quality enhancement on a video stream comprising the image when the image is the converted image.

14. The method as claimed in claim 12, wherein a target region of the plurality of regions comprises a first pixel, a second pixel and a third pixel in sequence, the first pixel has a first gray-scale value, the second pixel has a second gray-scale value, the third pixel has a third gray-scale value, and the step of calculating an absolute gray-scale difference comprises:

determining a median gray-scale value from the first gray-scale value, the second gray-scale value and the third gray-scale value;

calculating a difference between the second gray-scale value and the median gray-scale value; and determining the gray-scale variation level of the target region according to the difference.

15. The method as claimed in claim 14, wherein the gray-scale variation level is equal to a weight corresponding to the difference.

16. The method as claimed in claim 12, wherein the step of determining whether the image is the converted image converted from the low-resolution image to the high-resolution image comprises:

calculating a sum of the plurality of gray-scale variation levels, and comparing the sum with a sum threshold; and determining the image as the converted image when the sum is lower than the threshold.

* * * * *